US008829753B2

United States Patent
Maruyama (10) Patent No.: US 8,829,753 B2
(45) Date of Patent: Sep. 9, 2014

(54) PERMANENT MAGNET MOTOR HAVING ROTOR COVER

(75) Inventor: Nobuchika Maruyama, Nagano (JP)

(73) Assignee: Shinano Kenshi Co., Ltd., Nagano (JP)

( * ) Notice: Subject to any disclaimer, the term of this patent is extended or adjusted under 35 U.S.C. 154(b) by 286 days.

(21) Appl. No.: 13/350,160

(22) Filed: Jan. 13, 2012

(65) Prior Publication Data

US 2012/0187792 A1    Jul. 26, 2012

(30) Foreign Application Priority Data

Jan. 25, 2011 (JP) ................................ 2011-013467

(51) Int. Cl.
| | |
|---|---|
| *H02K 1/27* | (2006.01) |
| *H02K 1/28* | (2006.01) |
| *H02K 21/12* | (2006.01) |
| *H02K 21/14* | (2006.01) |
| *H02K 15/03* | (2006.01) |

(52) U.S. Cl.
 CPC ............... *H02K 1/278* (2013.01); *H02K 21/14* (2013.01); *H02K 1/28* (2013.01); *H02K 21/12* (2013.01); *H02K 1/2753* (2013.01); *H02K 15/03* (2013.01)
 USPC ............ 310/156.28; 310/156.08; 310/156.12; 310/156.23; 310/156.48; 310/156.49; 310/156.19

(58) Field of Classification Search
 CPC ....... H02K 1/2753; H02K 1/28; H02K 15/03; H02K 21/12; H02K 1/278; H02K 21/14
 USPC ............. 310/156.08, 156.09, 156.12, 156.28, 310/156.29, 156.48, 156.49, 156.57, 156.23

IPC ................................ H02K 1/27,1/28
 See application file for complete search history.

(56) References Cited

U.S. PATENT DOCUMENTS

| | | | | |
|---|---|---|---|---|
| 4,855,630 | A * | 8/1989 | Cole ......................... | 310/156.28 |
| 4,954,736 | A * | 9/1990 | Kawamoto et al. ...... | 310/156.21 |
| 4,973,872 | A * | 11/1990 | Dohogne ................. | 310/156.28 |
| 5,650,680 | A   | 7/1997 | Chula | |
| 6,492,755 | B1 * | 12/2002 | Jones ........................ | 310/156.12 |
| 6,940,199 | B2 * | 9/2005 | Imamura et al. ......... | 310/156.48 |
| 7,701,100 | B2 * | 4/2010 | Morel ....................... | 310/156.19 |
| 7,741,747 | B2 * | 6/2010 | Yamamura et al. ...... | 310/156.28 |
| 7,888,835 | B2 * | 2/2011 | Yang et al. ............... | 310/156.19 |

(Continued)

FOREIGN PATENT DOCUMENTS

| | | |
|---|---|---|
| CN | 101599665 A | 12/2009 |
| CN | 101897108 A | 11/2010 |

(Continued)

OTHER PUBLICATIONS

Dec. 4, 2013 Office Action issued in Chinese Application No. 201210019715.2 (with English translation).

(Continued)

*Primary Examiner* — John K Kim
(74) *Attorney, Agent, or Firm* — Oliff PLC (57) ABSTRACT

A motor includes: a rotor comprising: a rotary shaft; a magnetic body rotatable together with the rotary shaft; and first and second permanent magnets fixed on an outer circumference or an inner circumference of the magnetic body, and a stator comprising: an iron core arranged around the rotor; and a coil for exciting the iron core.

2 Claims, 6 Drawing Sheets

(56) References Cited

U.S. PATENT DOCUMENTS

| | | | |
|---|---|---|---|
| 8,203,245 B2 * | 6/2012 | Ishikawa et al. | 310/156.12 |
| 8,288,914 B2 * | 10/2012 | Qin et al. | 310/216.113 |
| 8,598,762 B2 * | 12/2013 | Nakano et al. | 310/156.45 |
| 2002/0162939 A1 * | 11/2002 | Heidrich | 248/683 |
| 2006/0138894 A1 * | 6/2006 | Harada et al. | 310/217 |
| 2007/0222317 A1 * | 9/2007 | Morel | 310/156.01 |
| 2009/0015091 A1 * | 1/2009 | Yang et al. | 310/156.09 |
| 2010/0244607 A1 * | 9/2010 | Fujimoto et al. | 310/156.21 |
| 2010/0289365 A1 | 11/2010 | Bando et al. | |
| 2012/0187792 A1 * | 7/2012 | Maruyama | 310/156.28 |

FOREIGN PATENT DOCUMENTS

| | | |
|---|---|---|
| JP | U-59-099686 | 7/1984 |
| JP | A-08-065929 | 3/1996 |
| JP | A-2005-341707 | 12/2005 |
| JP | A-2009-072015 | 4/2009 |

OTHER PUBLICATIONS

May 20, 2014 Notification of Reasons for Refusal issued in Japanese Patent Application No. 2011-013467 (with English translation).

* cited by examiner

PERMANENT MAGNET MOTOR HAVING ROTOR COVER

CROSS-REFERENCE TO RELATED APPLICATION

This application is based upon and claims the benefit of priority of the prior Japanese Patent Application No. 2011-013467, filed on Jan. 25, 2011, the entire contents of which are incorporated herein by reference.

BACKGROUND (i) Technical Field

The present invention relates to a motor.

(ii) Related Art

There is known a motor including: a rotor; a stator arranged around the rotor. The rotor includes: a rotary shaft; a magnetic body fixed to the rotary shaft; and plural permanent magnets fixed on an outer circumference of the magnetic body. The stator includes: an iron core; and a coil for exciting the iron core. Such a magnetic body may have projections for positioning the permanent magnets. Such a projection is sandwiched between the adjacent permanent magnets. Japanese Patent Application Publication No. 8-65929 and Japanese Utility Model Application Publication No. 59-99686 disclose techniques relevant to such a motor.

Magnetic field lines have emanated from one of the adjacent permanent magnets may partially extend to the other thereof through the projection. Such magnetic field lines may not contribute to a magnetic attractive force or a magnetic repulsive force generated between the permanent magnets and the iron core. This may reduce the torque of the rotor.

SUMMARY

It is therefore an object of the present invention to provide a motor in which a reduction in torque is suppressed.

A motor includes: a rotor comprising: a rotary shaft; a magnetic body rotatable together with the rotary shaft; and first and second permanent magnets fixed on an outer circumference or an inner circumference of the magnetic body, and a stator comprising: an iron core arranged around the rotor; and a coil for exciting the iron core, wherein the first and second permanent magnets are arranged such that different polarities of the first and second permanent magnets respectively face the stator, the magnetic body comprises first and second projections protruding to the first and second permanent magnets side and respectively abutting with a side surface of the first permanent magnet and a side surface of the second permanent magnet, a groove is formed between the first and second projections adjacent to each other, and a bottom of the groove overlaps a virtual extension line extending from an inner surface of the first permanent magnet abutting with the magnetic body or is located radially inward with respect to the virtual extension line, when viewed from an axial direction of the rotary shaft.

The bottom of the groove formed between the first and second projections is identical to the virtual extension line extending from the inner surface of the permanent magnet or is located radially inward with respect to the virtual extension line. Therefore, an air layer can be sufficiently ensured within the groove. This suppresses the magnetic field lines that have emanated from the first permanent magnet from extending to the second permanent magnet instead of the iron core. It is thus possible to suppress a reduction in torque.

DETAILED DESCRIPTION

Figure 1:
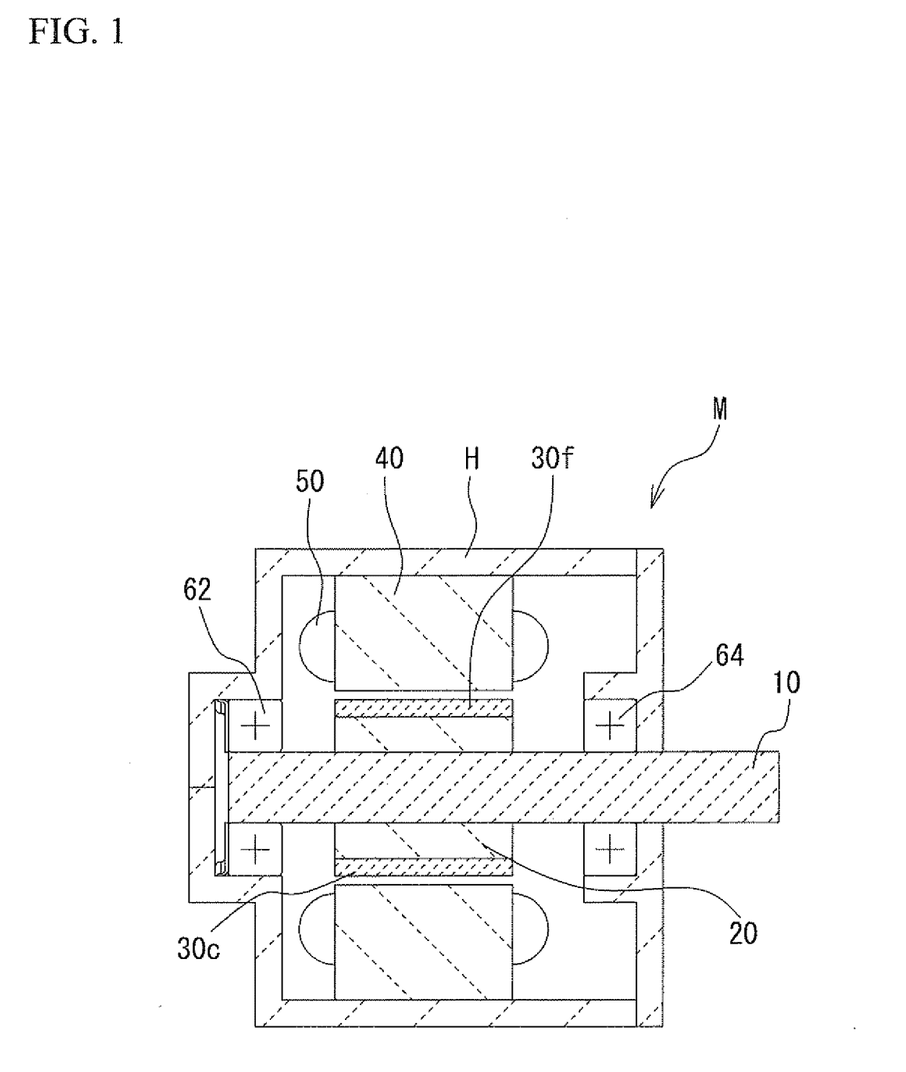
FIG. 1 is a section view of a motor according to the present embodiment.

FIG. 1 is a section view of a motor M according to the present embodiment. The motor M includes: a housing H; and a rotor and a stator housed in the housing H. The rotor includes: a rotary shaft 10 rotatably supported by bearings 62 and 64; a magnetic body 20 fixed to the rotary shaft 10, and permanent magnets 30c and 30f fixed on an outer circumference of the magnetic body 20. The permanent magnets 30c and 30f will be described later in detail. The magnetic body 20 is made of a magnetic material such as a magnetic steel. The stator includes: iron cores 40 arranged around the rotor; and coils 50 respectively wound around the iron cores 40. The coil 50 is energized to excite the iron core 40 so as to have predetermined polarities. The rotor is rotated relative to the stator by the magnetic attraction force and the magnetic repulsive force generated between the iron cores 40 and the permanent magnets 30c and 30f. This rotates the rotary shaft 10.

Figure 2A:
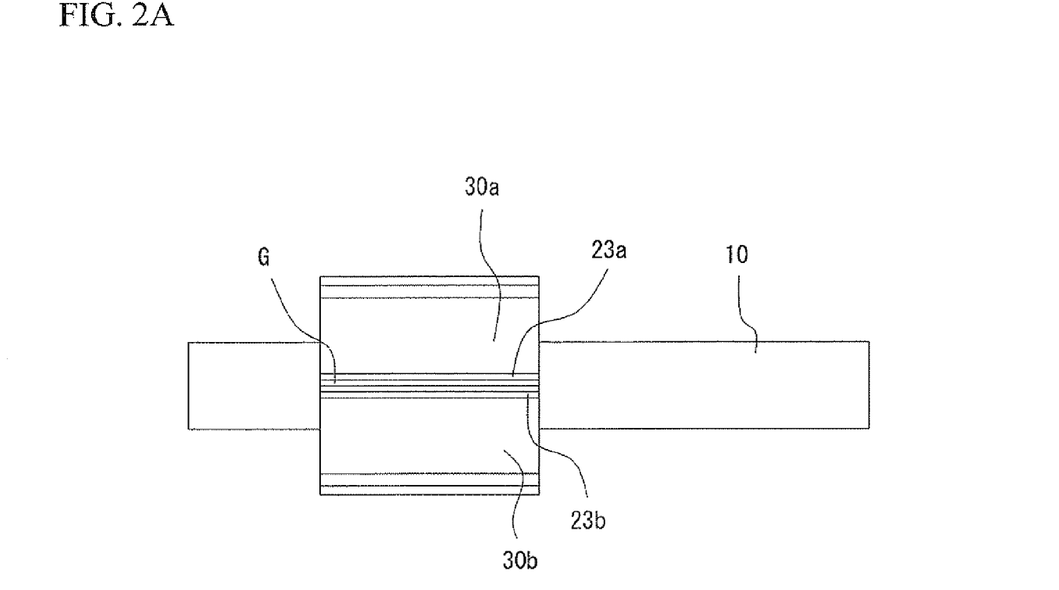
FIG. 2A is a side view of a rotor.
Figure 2B:
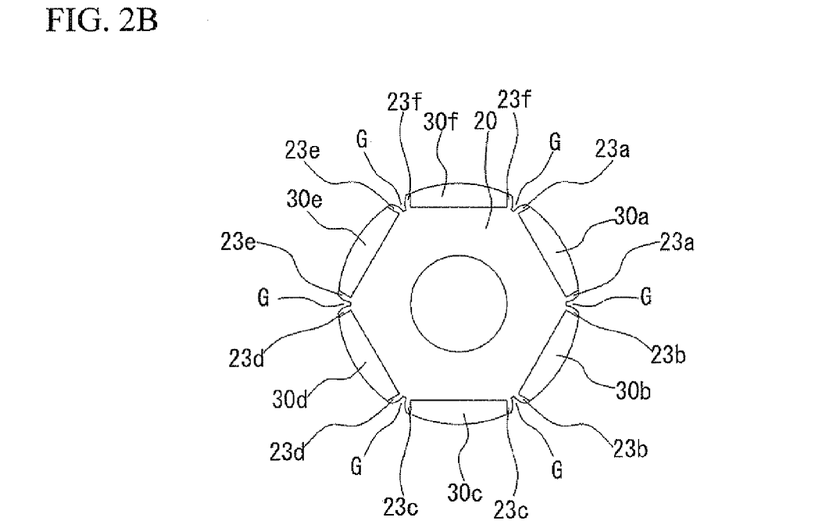
FIG. 2B is a view of the rotor when viewed in its axial direction.

FIG. 2A is a side view of the rotor. FIG. 2B is a view of the rotor when viewed in its axial direction. Plural permanent magnet 30a to 30f are fixed on an outer circumferential surface of the magnetic body 20. The magnetic body 20 has a substantially hexagonal shape when viewed in the axial direction. The magnetic body 20 is formed with a through hole into which the rotary shaft 10 is press-fitted. The adjacent permanent magnets are arranged such that different polarities thereof respectively face the radial outside of the rotary shaft 10. In other words, the adjacent permanent magnets are arranged such that different polarities thereof respectively face the stator. The magnetic body 20 is provided with projections 23a to 23f which respectively abut with and position the side surfaces of the permanent magnets 30a to 30f. The projections 23a to 23f protrude radially outward. In other words, the projections 23a to 23f respectively protrude to the permanent magnets 30a to 30f sides. The permanent magnet 30a is positioned to be sandwiched by two projections 23a. The permanent magnets 30a to 30f are respectively fixed on plane surfaces of the outer circumference of the magnetic body 20. After the permanent magnets 30a to 30f are positioned by the projections 23a to 23f, the permanent magnets 30a to 30f are adhered to the magnetic body 20 with an adhesive. Additionally, the adjacent permanent magnets function as a pair having an N pole and an S pole, and the pair has tow or more poles.

The groove G is formed between the adjacent projections 23a and 23b. Also, the groove G is formed between the other adjacent projections. These projections 23a to 23f are formed to extend in the axial direction of the magnetic body 20, as illustrated in FIG. 2A. Each length of the projections 23a to 23f and the grooves G in the axial direction are the same as each length of the permanent magnets and the magnetic body 20.

Figure 3:
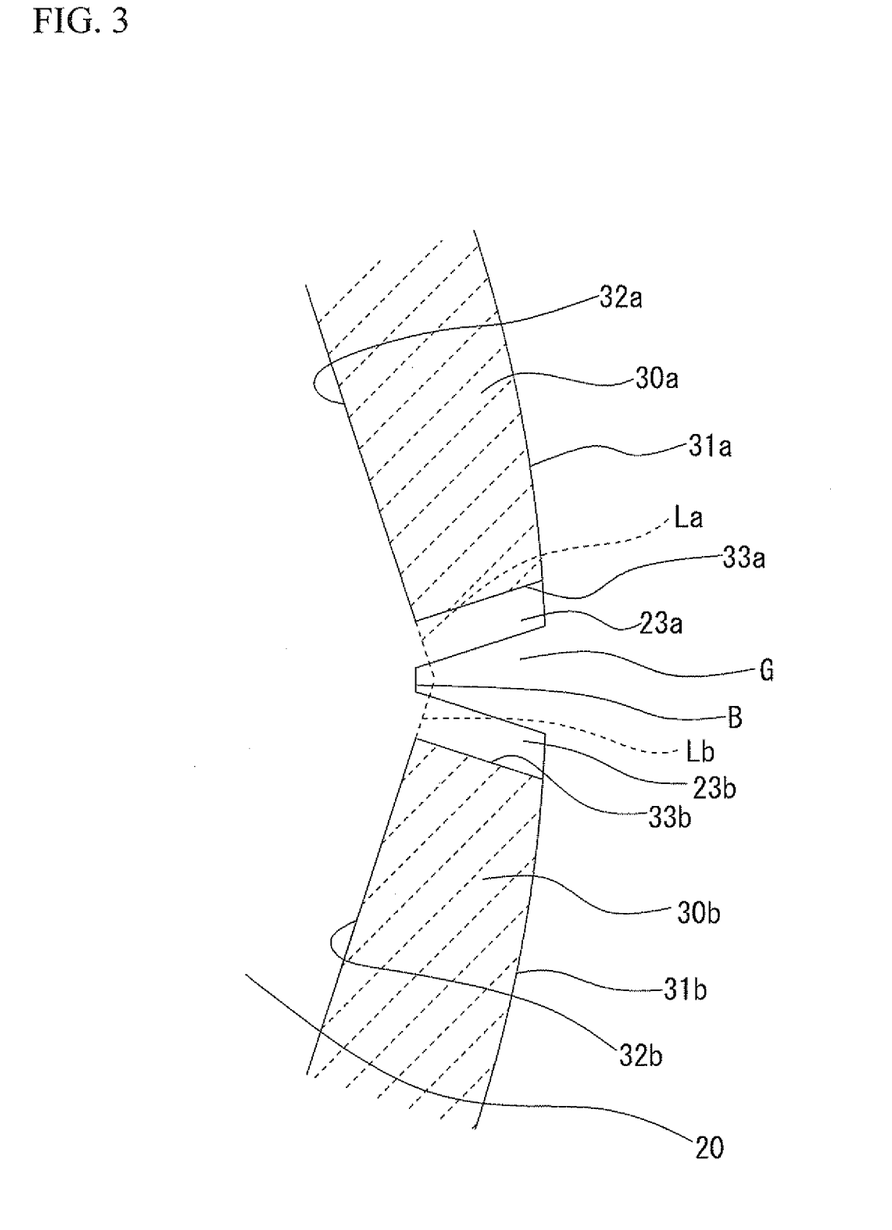
FIG. 3 is an enlarged view of a groove.

FIG. 3 is an enlarged view of the groove G. The permanent magnet 30a includes: an outer surface 31a facing radially outward; an inner surface 32a facing radially inward and abutting with the magnetic body 20; and a side surface 33a abutting with the projection 23a. Likewise, the permanent magnet 30b includes: an outer surface 31b facing radially outward; an inner surface 32b facing radially inward and abutting with the magnetic body 20; and a side surface 33b abutting with the projection 23b. For example, the outer surface 31a of the permanent magnet 30a is magnetized to have the N pole, the inner surface 32a is magnetized to have the S pole, the outer surface 31b of the permanent magnet 30b is magnetized to have the S pole, and the inner surface 32b is magnetized to have the N pole. Thus, the outer surface 31a of the permanent magnet 30a and the outer surface 31b of the permanent magnet 30b are magnetized to have different polarities.

A length of the projection 23a in the radially outward direction is substantially the same as the thickness of the permanent magnet 30a. The projection 23a abuts with the whole side surface 33a. This applies to the projection 23b. The width of the groove G in the circumferential direction of the magnetic body 20 is greater in the radially outward direction. A bottom B of the groove G is located radially inward with respect to a virtual extension line La of the inner surface 32a and a virtual extension line Lb of the inner surface 32b, when the rotor is viewed in the axial direction.

In a case where the magnetic body is partially interposed between the side surfaces 33a and 33b without providing the groove G therebetween, the magnetic field lines that have emanated from the outer surface 31a of the permanent magnet 30a may partially extend to the outer surface 31b of the permanent magnet 30b through the magnetic body 20 instead of the iron core 40. Such magnetic field lines may not contribute to the magnetic attractive force or the magnetic repulsive force generated between the permanent magnets 30a and 30b and the iron core 40.
This reduces the torque.

In the present embodiment, the groove G is provided between the adjacent projections 23a and 23b, in other words, between the side surfaces 33a and 33b. The provision of the groove G between the side surfaces 33a and 33b forms an air layer therebetween. Herein, the magnetic permeability of the air is lower than that of the magnetic body 20. This suppresses the magnetic field lines that have emanated from the outer surface 31a of the permanent magnet 30a from directly extending to the outer surface 31b of the permanent magnet 30b through the magnetic body 20. This suppresses a reduction in torque of the rotor. Further, the projections 23a to 23f respectively position the permanent magnets 30a to 30f, thereby suppressing a reduction in torque while ensuring the performance of assembling the permanent magnets 30a to 30f into the magnetic body 20.

Furthermore, as mentioned above, the bottom B of the groove G is located radially inward with respect to the virtual extension line La from the inner surface 32a and the virtual extension line Lb from the inner surface 32b, when the rotor is viewed in the axial direction. Therefore, the air layer is sufficiently provided between the permanent magnets 30a and 30b. This suppresses a reduction in torque.

Also, the inner surface of the groove G spreads in the radially outward direction. Thus, the distance between the projections 23a and 23b is greater in the radially outward direction.

Next, variations will be described. FIGS. 4A to 5C are explanatory views of variations of the projections and grooves. Additionally, similar components will be designated with similar reference numerals and the duplication descriptions thereof will be omitted here.

Figure 4A:
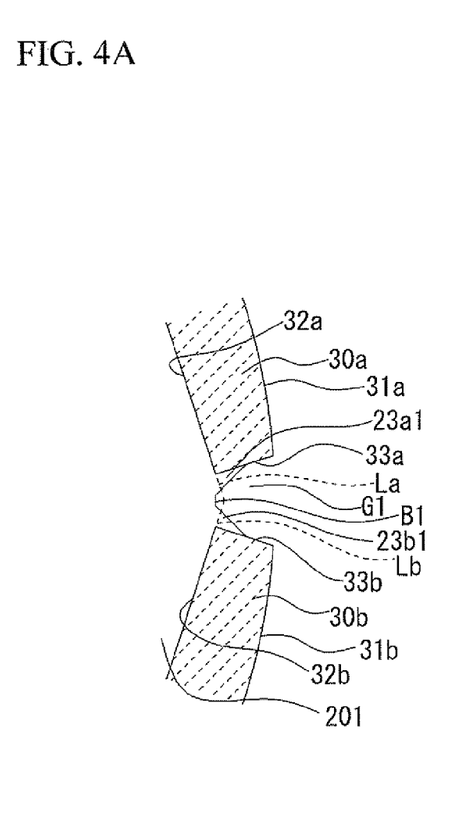
FIGS. 4A to 4C are explanatory views of projections and grooves according to variations.

As illustrated in FIG. 4A, the length of projections 23a1 and 23b1 of the magnetic body 20 in the radial direction is smaller than each thickness of the permanent magnets 30a and 30b. Thus, the projections 23a1 and 23b1 respectively abut with parts of bases of the side surfaces 33a and 33b, and respectively expose the remaining parts of the side surfaces 33a and 33b. Also, a bottom B1 of the groove G1 formed between the projections 23a1 and 23b1 is located radially inward with respect to the virtual extension lines La and Lb. Such a shape of the groove G1 suppresses a reduction in torque.

Figure 4B:
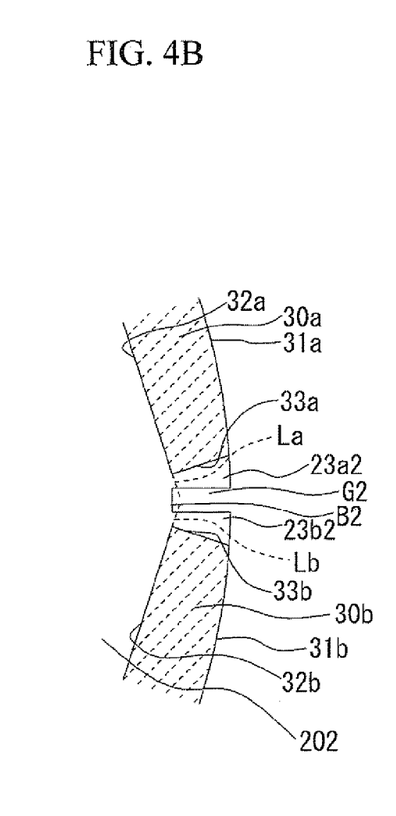

As illustrated in FIG. 4B, a width of the groove G2 formed between projections 23a2 and 23b2 of a magnetic body 202 is constant in the radially outward direction. Also, a bottom B2 of the groove G2 is located radially inward with respect to the virtual extension lines La and Lb. The bottom B2 has a plane shape. Such a shape of the groove G2 suppresses a reduction in torque.

Figure 4C:
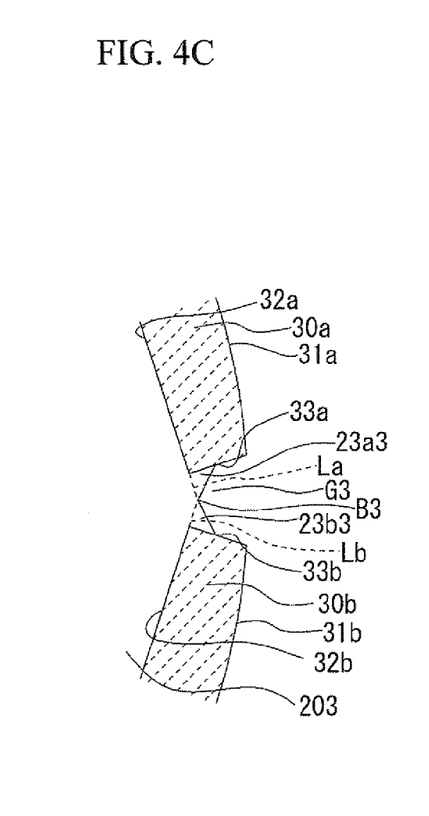

As illustrated in FIG. 4C, each length of projections 23a3 and 23b3 of a magnetic body 203 in the radial direction is smaller than each thickness of the permanent magnets 30a and 30b. Thus, the projections 23a3 and 23b3 respectively abut with parts of bases of the side surfaces 33a and 33b, and respectively expose the remaining parts of the side surfaces 33a and 33b. Also, a bottom B3 of the groove G3 is formed in such a position to overlap the virtual extension lines La and Lb. Such a shape of the groove G3 suppresses a reduction in torque.

Figure 5A:
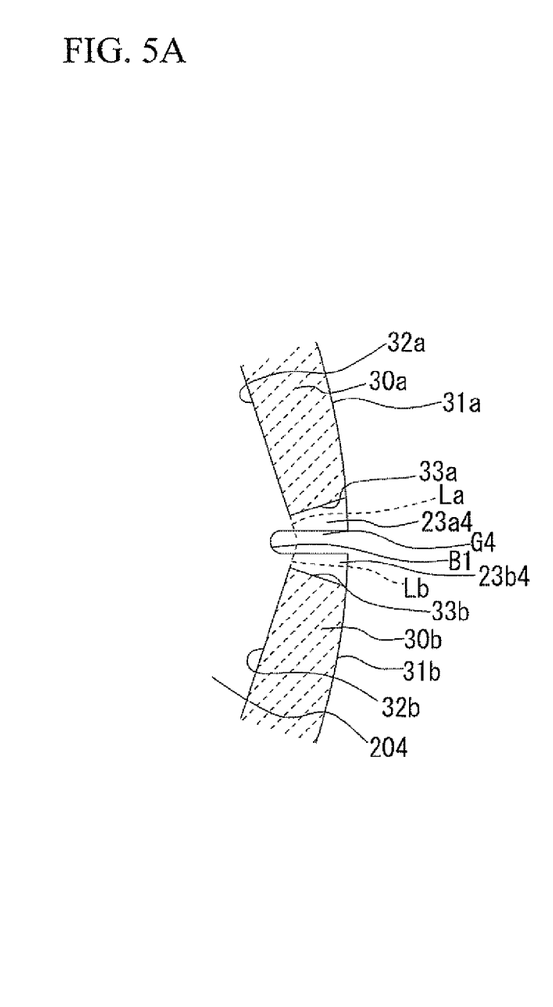
FIGS. 5A to 5C are explanatory views of projections and grooves according to variations.

As illustrated in FIG. 5A, a bottom B4 of a groove G4 formed between projections 23a4 and 23b4 of a magnetic body 204 has a curved shape. Also, the bottom B4 is located radially inward with respect to virtual extension lines La and Lb. Such a shape of the groove G4 suppresses a reduction in torque.

Figure 5B:
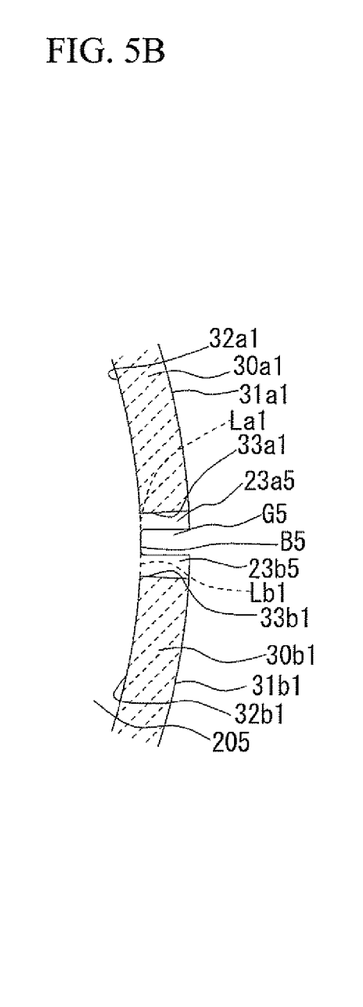

As illustrated in FIG. 5B, surfaces of a magnetic body 205 where permanent magnets 30a1 and 30b1 are respectively fixed each have a curved shape. Also, the permanent magnets 30a1 and 30b1 each have a thickness substantially uniform. A bottom B5 of a groove G5 formed between projections 23a5 and 23b5 is formed in such a position to overlap the virtual extension lines La1 and Lb1. Such a shape of the groove G5 suppresses a reduction in torque.

Figure 5C:
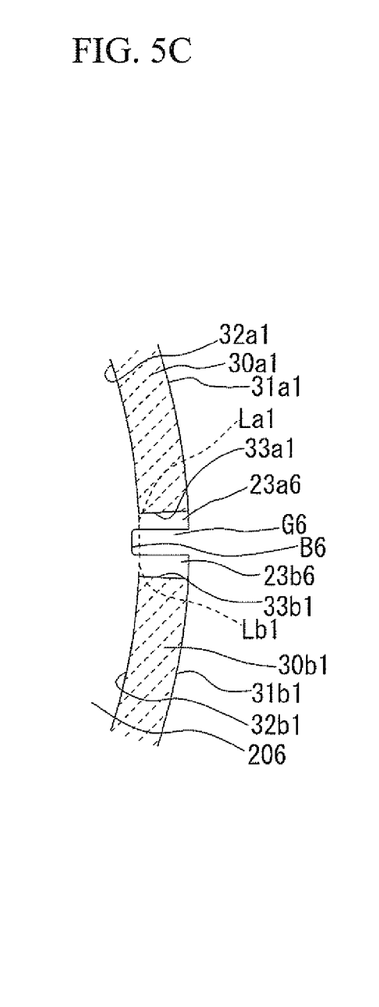

As illustrated in FIG. 5C, a bottom B6 of a groove G6 formed between projections 23a6 and 23b6 of a magnetic body 206 is located radially inward with respect to the virtual extension lines La1 and Lb1. Such a shape of the groove G6 suppresses a reduction in torque.

Figure 6:
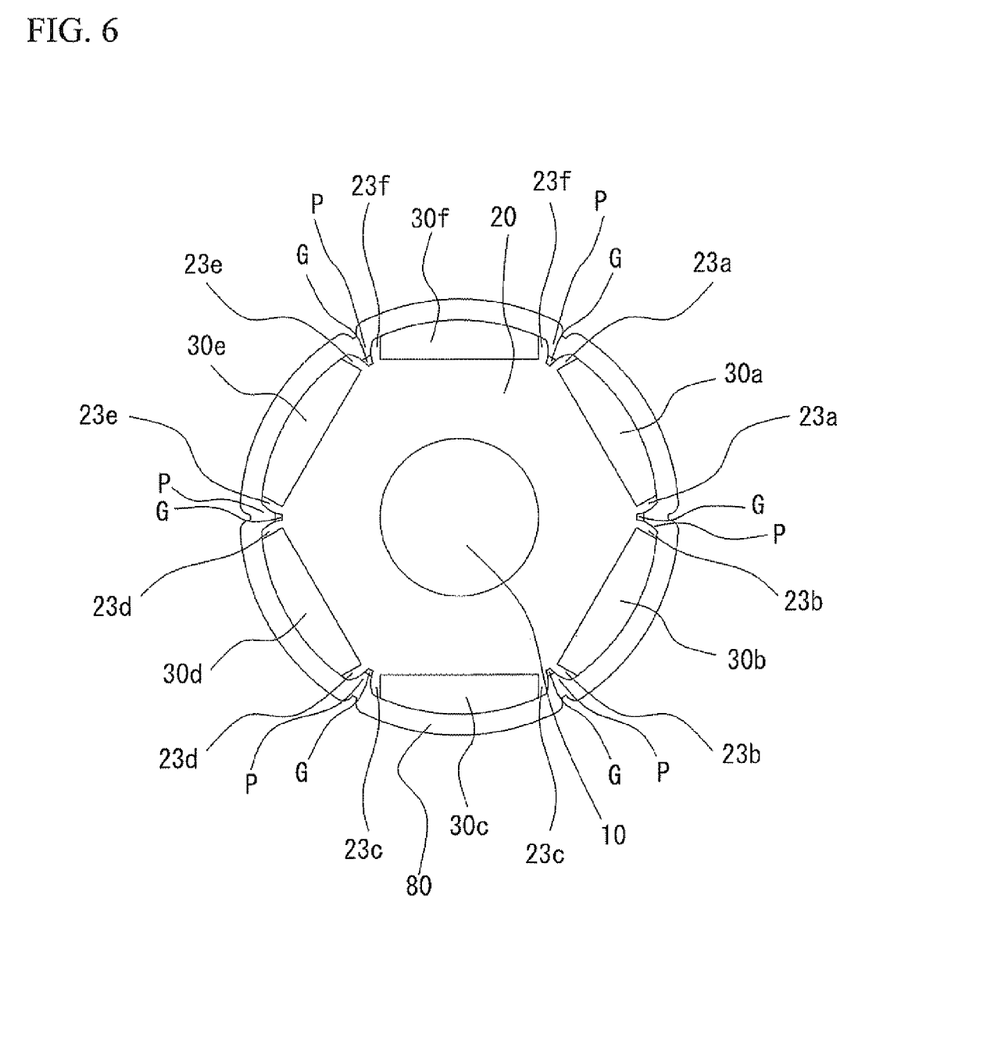
FIG. 6 is a view of the rotor into which a cover is assembled.

FIG. 6 is a view of the rotor into which a cover 80 is assembled. The cover 80 has a substantially cylindrical shape, and is formed of a non-magnetic body. The cover 80 is formed with fitting portions P which are respectively insertable into the grooves G. The plural fitting portions P are formed in the circumferential direction and protrude in the radially inward direction. Thus, the cover 80 is assembled into the rotor, thereby preventing the permanent magnets 30a to 30f from being disengaging from the magnetic body 20. Also, the fitting portions of the cover 80 are respectively inserted into the grooves G of the magnetic body 20, thereby preventing the cover 80 from rotating relative to the magnetic body 20 and preventing the cover 80 from rattling relative to the magnetic body 20. Additionally, the cover 80 does not influence the magnetic forces of the permanent magnets 30a to 30f because the cover 80 is the non-magnetic body.

While the exemplary embodiments of the present invention have been illustrated in detail, the present invention is not limited to the above-mentioned embodiments, and other embodiments, variations and modifications may be made without departing from the scope of the present invention.

Additionally, the size, in the radial direction, of the groove G (the size of the air layer) may be extremely small. Herein, in consideration of press working performed in manufacturing the magnetic body 20 and workability in adhering the permanent magnet to the magnetic body 20, it is preferable that the size, in the radial direction, of the groove G is 0.1 mm or more. Since an increase in the size, in the radial direction, of the groove G reduces the torque output, a reduction in the size of the permanent magnet will further reduce the torque. Thus, a reduction in thickness, in the circumferential direction, of the projection is conceivable without reducing the size of the permanent magnet 30. However, in a case where the projection is too thin in the circumferential direction, the projection may be easily bent in positioning the permanent magnet and may not play a role as a positioning member.

The above embodiment has described the example where the six permanent magnets 30a to 30f are fixed to the single magnetic body 20. However, the number of the permanent magnets is not limited to six.

The above embodiment has described the inner rotor type. However, the present invention may be an outer rotor type.

What is claimed is:

1. A motor comprising:
   a rotor comprising:
     a rotary shaft;
     a magnetic body rotatable together with the rotary shaft; and
     first and second permanent magnets fixed on an outer circumference or an inner circumference of the magnetic body, and
   a stator comprising:
     an iron core arranged around the rotor; and
     a coil for exciting the iron core,
   wherein the first and second permanent magnets are arranged such that different polarities of the first and second permanent magnets respectively face the stator,
   the magnetic body comprises first and second projections protruding to the first and second permanent magnets side and respectively abutting with a side surface of the first permanent magnet and a side surface of the second permanent magnet,
   a groove is formed between the first and second projections adjacent to each other, and
   a bottom of the groove overlaps a virtual extension line extending from an inner surface of the first permanent magnet abutting with the magnetic body or is located radially inward with respect to the virtual extension line, when viewed from an axial direction of the rotary shaft,
   wherein the motor further comprises a cover having a fitting portion to be fitted into the groove,
   the first and second permanent magnets comprise plural pairs of the first permanent magnets and second permanent magnets,
   the first and second projections comprise plural pairs of the first and second projections respectively corresponding to the plural pairs of the first and second permanent magnets,
   the groove comprises plural grooves respectively formed between the plural pairs of the first and second projections,
   the cover has a substantially cylindrical shape, and is formed of a non-magnetic body,
   the fitting portion comprises plural fitting portions, and
   the plural fitting portions are formed in a circumferential direction of the cover, the plural fitting portions protrude in a radially inward direction of the cover, and the plural fitting portions are respectively fitted into the plural grooves.

2. The motor of claim 1, wherein a length of the groove in the axial direction is the same as a length of each of the first and second permanent magnets in the axial direction.

* * * * *